Figure 1:
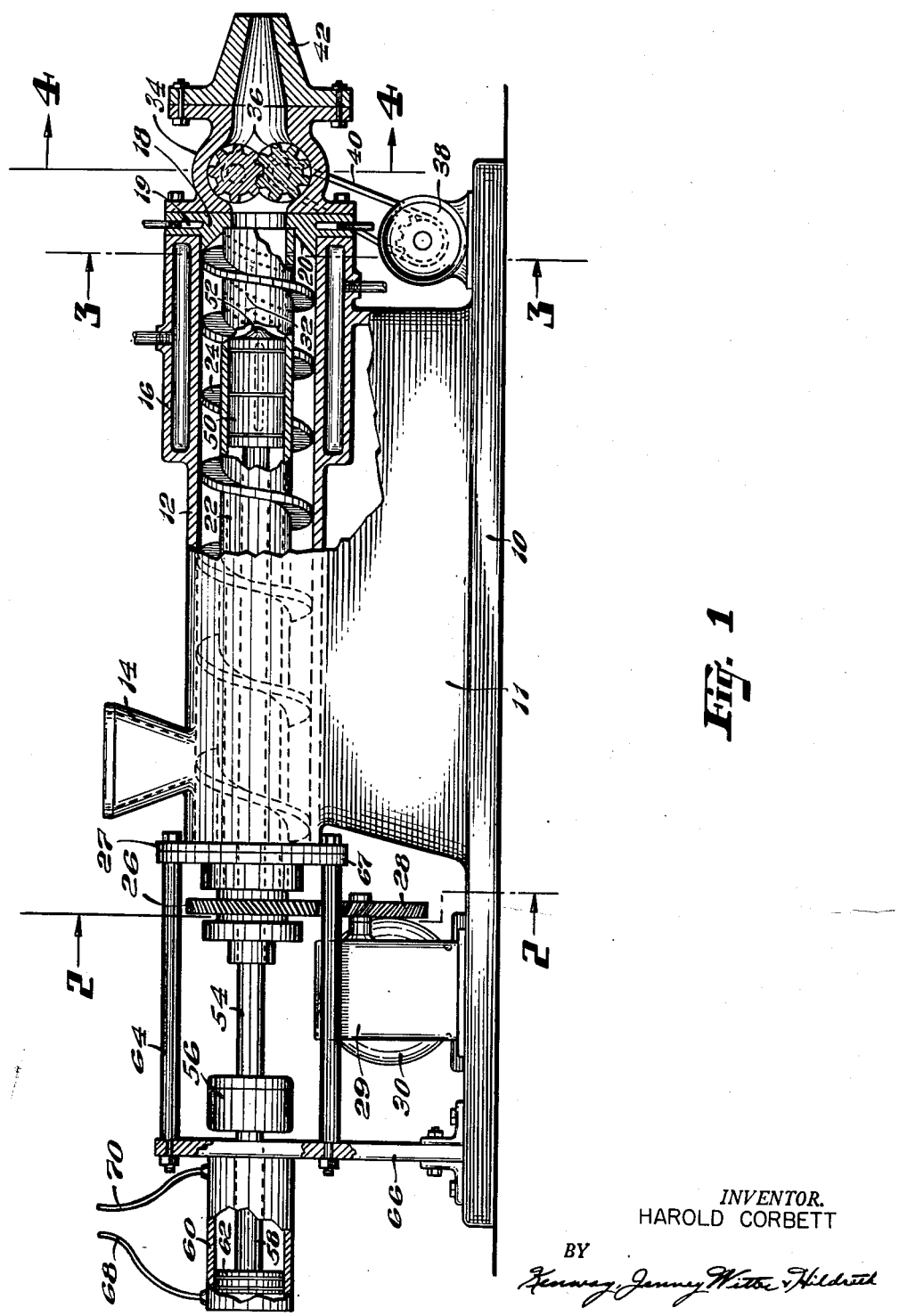

June 15, 1954

H. CORBETT 2,680,880

MACHINE FOR COMBINED EXTRUDING AND INJECTION MOLDING

Filed Feb. 12, 1953

4 Sheets-Sheet 1

INVENTOR.
HAROLD CORBETT
BY
ATTORNEYS

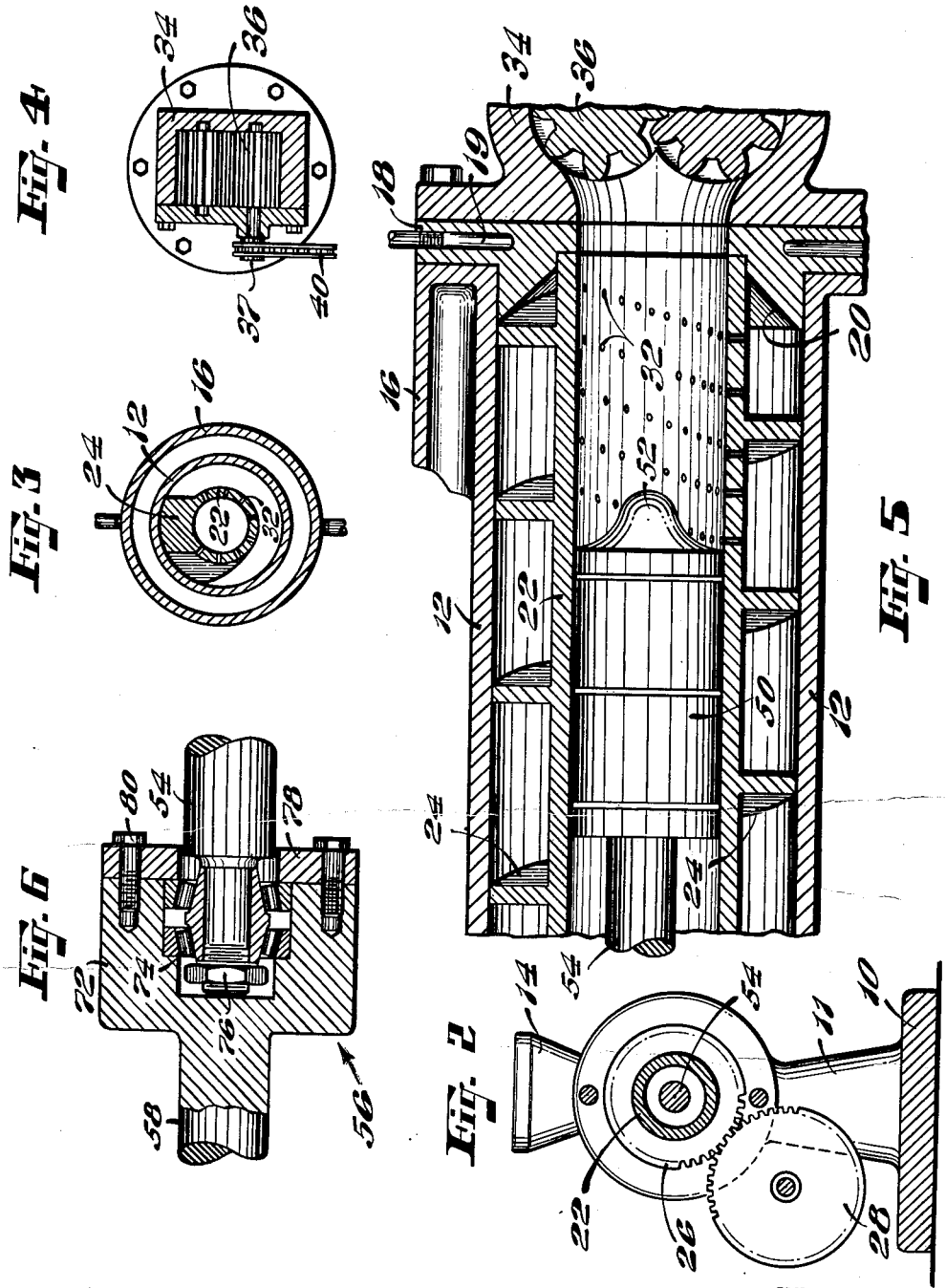

INVENTOR.
HAROLD CORBETT
BY
ATTORNEYS

INVENTOR.
HAROLD CORBETT

Patented June 15, 1954

2,680,880

UNITED STATES PATENT OFFICE 2,680,880

MACHINE FOR COMBINED EXTRUDING AND INJECTION MOLDING

Harold Corbett, Denville, N. J.

Application February 12, 1953, Serial No. 336,598

23 Claims. (Cl. 18—12)

This invention relates to a machine constructed and arranged for operation on thermoplastic materials and the like, either for extrusion or for injection molding. The present application is a continuation-in-part of my copending applications Ser. No. 156,207, filed April 15, 1950, now forfeited, and Ser. No. 266,825, filed January 17, 1852, now forfeited.

The primary object of the invention is to provide in a single unit of equipment substantially simultaneous mixing, homogenizing, compressing, measuring, extruding and/or injecting, either continuously or intermittently, in order to effect significant reduction of labor and power costs.

Another object of the invention is to provide simple and effective equipment by means of which may be obtained a complete and thorough mixing of the various components of the plastic material, whether it consists of a plastic resin or comparable material with or without various fillers, extenders, plasticizers, coloring pigments, hardeners, curing agents, auxiliaries and the like.

An important feature of the invention resides in a substantially cylindrical barrel in which operates a hollow feed screw having a series of rows of ports adjacent its discharge end so that material carried along the barrel by the endless screw is forced into the interior of the screw through the ports, there being a ram operating in the interior of the screw which may be reciprocated to force the plastic material through a nozzle into an injection mold or which may be subjected to a constant operating pressure to provide smooth extrusion through a suitable extruding head.

Another feature of the invention comprises means for applying a constant predetermined pressure to the piston, when the machine is set up for extruding, the result being that as the pressure in the tube in advance of the piston varies from time to time, the piston will move in response thereto so that the pressure with which the plastic material is fed to the nozzle is maintained substantially constant. In this way the extruded product may be maintained of uniform quality and dimension within very close limits, since the piston acts to smooth out pressure variations which ordinarily affect the product deleteriously.

Another important feature of the invention consists in limiting the stroke of the piston, when the machine is arranged for injection molding, from a retracted position in which it just uncovers the rearmost row of ports to an advanced position in which the front face of the piston almost closes the foremost ports. The result of this arrangement is that the entire volume of the tube in advance of the retracted piston first becomes filled with plastic material, voids and pockets being eliminated, and when the piston has completed its injection stroke, it travels only a negligible distance before the foremost row of ports is opened and plastic material is drawn through the ports at once as the piston retreats. The result is that no vacuum is drawn during the return stroke of the piston, a defect in prior attempts to produce satisfactory molding machines.

Another feature of the invention comprises hydraulic or pneumatic means which may be coupled to operate the machine as an extruder and supply constant pressure to the piston, or coupled to operate the piston and an injection mold automatically through a cycle of molding steps.

Figure 7:
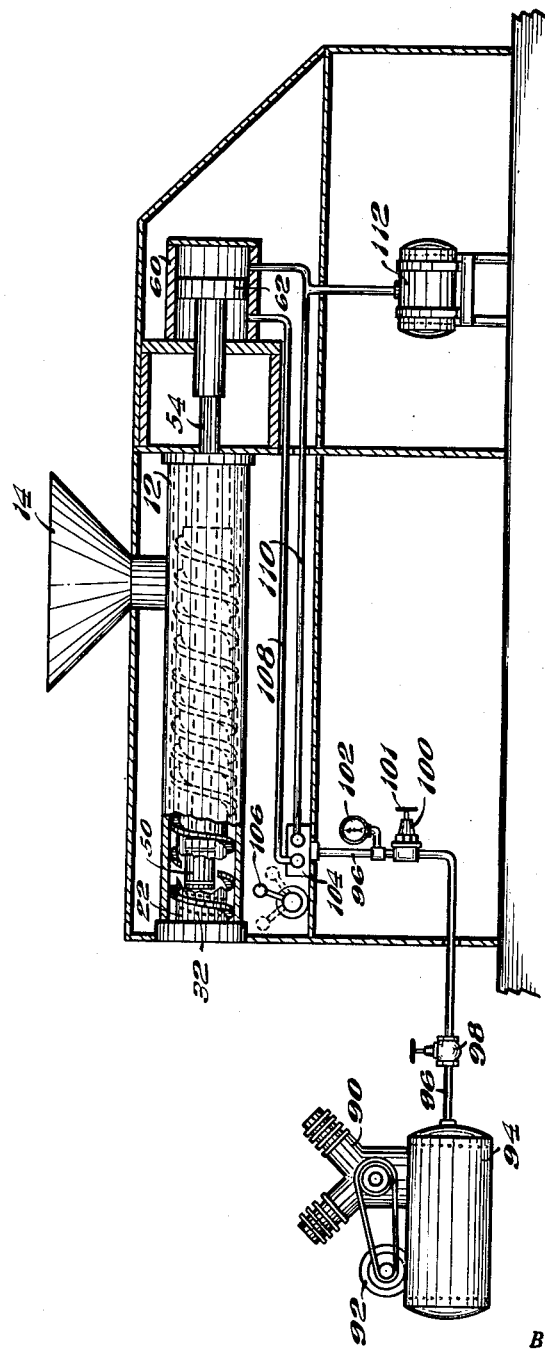
Figure 8:
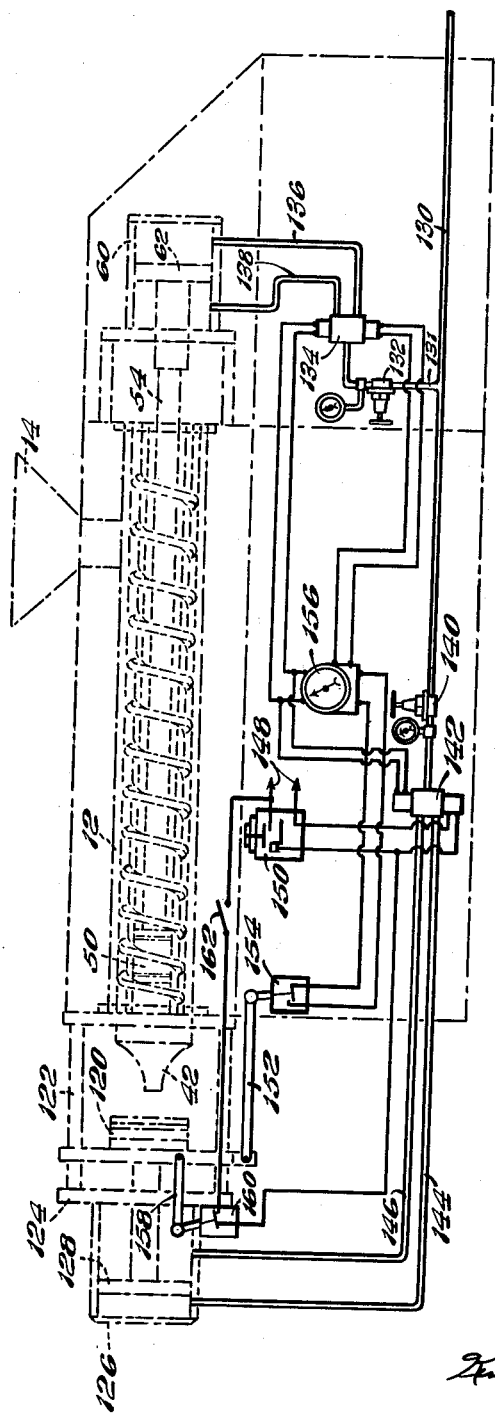

These and other objects and features of the invention will be more readily understood and appreciated from the following detailed description of a preferred embodiment thereof selected for purposes of illustration and shown in the accompanying drawings in which:

Fig. 1 is a view of my novel apparatus primarily in side elevation, but partly in longitudinal section to disclose details, Fig. 2 is a vertical section taken on the plane of line 2—2 of Fig. 1, Fig. 3 is a vertical section taken on the plane of line 3—3 of Fig. 1, Fig. 4 is a vertical section taken on the plane of line 4—4 of Fig. 1, Fig. 5 is an enlarged, substantially vertical fragmentary longitudinal sectional view taken through the discharge portion of the apparatus, Fig. 6 is a view in cross section through the coupling connecting the ram shaft to the hydraulically operated piston, Fig. 7 is a diagrammatic view showing the machine arranged for extrusion, and Fig. 8 is a diagrammatic view showing the machine arranged for injection molding.

As will best be seen in Figs. 1–6, the machine of the invention is organized about an elongated cylindrical metal barrel 12 preferably mounted horizontally on a pedestal 11 supported on a flat base plate 10; adjacent one end of the barrel 12 there is provided a hopper 14 through which material may be introduced into the interior of the barrel. Adjacent the other end of the barrel 12 there is provided a heating jacket 16 through which hot fluid may be circulated in customary fashion. While I have shown a heating jacket in the drawing, the precise nature of the means used to supply heat is not critical and forms no part of the invention, since electrical or other heating systems may be used at various places in the machine in accordance with general practices in the art.

Bolted tightly and in leak-proof relation upon the end of the barrel 12 is a flat annular end plate 18 provided with an interial chamber 19 for the circulation of a heating fluid and also provided with an inwardly extending inclined annular flange 20 received within the end of the barrel 12 and forming an inwardly directed inclined baffle plate. Rotatably mounted within the barrel 12 is a hollow cylindrical metal tube 22 which carries on its exterior surface a screw flight 24 extending from the rear end adjacent the hopper 14 to the forward or discharge end adjacent the end plate 18, the end of the tube being journalled in the baffle plate 18. Adjacent the discharge end of the machine and between the terminal courses of the screw flight 24, the tube 22 is provided with a number of rows of small through-and-through perforations or ports 32. In effect the forward end of the tube 22 is foraminous.

In order to rotate the tube 22 and the screw conveyor 24 there is provided a gear 26 secured adjacent the rear end of the tube 22 which projects beyond the rear end of the barrel 12 through a closure plate 27 secured tightly to the end of the barrel 12 and apertured snugly to engage the tube; the gear 26 meshes with a gear 28 on the shaft of a variable speed transmission unit 29 driven by a motor 30 mounted on the base plate 10. As the motor turns, the tube 22 is rotated so that the material dropped into the hopper 14 will be moved longitudinally along in the barrel 12 by the scraping action of the screw flight 24 until it reaches the discharge end thereof, at which time the plastic will be forced through the screening ports 32 and into the interior of the tube 22, during which the material is compounded and thoroughly mixed and worked.

Mounted snugly within the tube 22 is a cylindrical piston or ram 50 provided on its forward face with a convex nose portion 52, the purpose of the latter being to occupy space which might otherwise provide a pocket of air ahead of the piston as the plastic material enters the tube 22 through the ports 32. The piston 50 is made fast upon a shaft 54 extending within and concentric with the tube 22, the shaft 54 extending beyond the tube 22 at its rear end and terminating in a coupling 56 mounted upon the end of a shaft 58 working in a hydraulic or pneumatic cylinder 60 and secured to a conventional piston 62. The cylinder 60 is served by a pair of conduits 68 and 70 through which air or hydraulic fluid is supplied, and the cylinder 60 is mounted upon a standard 66 secured to the base 10 and braced by a plurality of tie rods 64 secured to the standard 66 and to a plate 67 secured to the plate 27 on the end of the barrel 12.

The coupling 56 is a rotary coupling; that is to say, it transmits the axial movement of the shaft 58 to the shaft 54 carrying the piston 50 but also permits the shaft 54 to rotate independently of the shaft 58. The coupling 56 comprises a cup-shaped housing 72 integral with the end of the shaft 58 and containing a roller bearing assembly 74 secured upon the end of the shaft 54 by a nut 76 working on a reduced threaded end of the shaft 54. An annular plate 78 surrounds the shaft 54, bears against the outer housing of the bearing assembly 74, and is secured to the housing 72 by means of a plurality of bolts 80. Consequently as the tube 22 with the screw 24 is rotated by means of the gears 26 and 28, the piston 50 turns with it. When the shaft 54 is not undergoing reciprocation, the only movement of the piston is in rotation, whereas when the shaft 54 is moved axially, the movement of the piston is spiral. An important result of this construction is the minimization of friction upon the surfaces of the piston 50 and the bore of the hollow tube 22 as well as the reduction of back pressure exerted upon the plastic material through the ports 32 as the piston is advanced. The cylinder 60 and its associated piston 62 may be operated in any suitable manner, either manually or automatically to reciprocate the ram or piston 50 through any variable range of movement or to maintain it in any desired position. However, the use to which the machine is put will largely determine the mode of operation of the piston 50. It will first be discussed in connection with injection molding wherein the piston is advanced through a predetermined distance at a predetermined time in order to eject a charge of plastic material from the end of the tube 22 and inject it into the cavity of a mold. For such operation the gear pump 34 is removed and the nozzle bolt directly to the end plate 18.

As the machine is operated, the plastic material introduced through the hopper 14 is conveyed axially along the barrel 12 by the screw 24 and during its travel is heated until it becomes plastic to a degree suitable for molding operations. At the discharge end of the tube 12 the plastic material extrudes radially inward through the ports 32 and into the space in advance of the piston. Shortly after the process commences, there is formed in the center of the tube 22 a mass which tends to resist rotation with the tube 22, and the result is that the strands or filaments of plastic coming through the ports 32 are laid or applied upon the mass in spiral fashion somewhat akin to the laying of a cable. The screening of the plastic through the ports 32 and the disposition of it in spiral strands produces an intimate mixing and blending action resulting in an exceptionally satisfactory product of uniform consistency and color.

The positions of the piston at the beginning of the cycle and at its extreme point of advance are both of great importance. If the piston at its retracted position were to lie any considerable distance behind the innermost ports 32, there would be formed immediately adjacent the forward end of the piston a pocket of air or gas which would introduce voids into the molded product. Therefore the position of the piston 50, the shafts 54 and 58 and the pistons 62 are so adjusted that the rearmost position of the piston 50 is one in which its forward face lies immediately behind the rearmost of the ports 32. The formation of voids is further prevented by the convex nose portion 52. As the piston is moved forward it begins to close the ports 32, a process which continues until the piston reaches its most advanced position at which it has almost closed the foremost of the ports 32. Consequently when the piston is again retracted, it immediately opens the foremost ports and further rearward movement operates to draw plastic material through the ports 32 into the interior of the tube 22. Alternatively the limit of the forward stroke of the piston may be set so that the foremost ports are just closed, although in practice it has appeared better practice to leave them slightly open. If the piston were to be moved any considerable distance in advance of the foremost ports, the result would be that in its rearward stroke it would first tend to draw a vacuum, either drawing air or plastic material back through the nozzle. However, in the machine of the invention, such troubles are entirely eliminated.

It will be noted that the screw 24 junctions as an impositive pressure pump, while the piston 50 serves as a positive displacement pump. Consequently the plastic material is advanced sequentially through impositive and positive pumps which are maintained substantially constantly in communication.

It is also important to note that the diameter of each of the ports 32 is very much smaller than that of the nozzle through which the plastic material leaves the machine. The result is that when the piston travels forward in its injection stroke, the pressure required to move the plastic through the nozzle is less than that required to move the plastic outwardly through the ports 32. To put it another way, the material will flow more readily in the direction of lowest pressure, and that is the direction of the nozzle, rather than radially outward through the ports 32. Moreover, as the cavity of an injection mold becomes fuller and fuller, the pressure required to fill the cavity increases. However, as the piston 50 moves forward, it closes more and more of the ports 32, and the pressure differential favorable to the movement of the plastic material through the nozzle is maintained throughout the cycle.

The function of the piston in extrusion is quite different. One of the most difficult problems encountered in the extrusion of plastic materials is the incidence of surges affecting the rate at which the material passes through the extrusion die and thereby affecting not only the uniformity of the product with respect to consistency, but also with respect to dimension. Here the piston is employed in the machine of the invention as a rate- or pressure-stabilizing instrumentality, analogous to the function of a smoothing condenser in electrical circuits. This result is achieved by first starting the machine with the piston in retracted position until plastic material begins to come through the nozzle or extrusion die. Then there is applied to the piston 50 a constant pressure tending to urge the piston forwardly against the plastic material flowing through the ports 32 into the interior of the tube 22. If for some reason the rate of supply of the plastic material to the space in advance of the piston decreases, the piston immediately moves forward to prevent a drop in pressure. Conversely, if the pressure within the tube 22 in advance of the piston should increase for some reason, the piston will at once retreat and relieve the excess pressure. Operation of the piston in this manner has been found to produce extruded plastic material of exceptional uniformity of consistency and dimension.

When the machine is to be employed as an extruder, there is bolted to the outer face of the plate 18 a housing 34 containing a gear pump including a pair of meshing gears 36 mounted on suitable stub shafts, one of which is driven by an exteriorly mounted sprocket 37 cooperating with a chain 40 driven by a motor 38 also mounted on the base plate 10. A nozzle 42 of conventional style is bolted to the discharge end of the gear pump 34, the nozzle including an extrusion die (not shown).

The plastic material then passes out through the annular end plate 18 into the gear pump which also adds to the control of the pressure and rate of flow. The rate of operation of the gear pump may be relatively high so that the pump will boost the pressure. Also the gear pump acts as a rotary valve to meter the flow of plastic material reaching the nozzle or extrusion die.

The gears 36 may be reversed for cleaning or purging of the material. Moreover the piston 50 may be moved to open or close desired numbers of ports to increase or decrease the rate and quantity of material allowed to reach the gear pump.

In Fig. 7 the machine of the invention is shown diagrammatically, the parts being numbered in similar fashion to the numbering employed in conjunction with Figs. 1–6, but generally simplified. The machine is shown with a system adapting it for use as an extruder, there being provided a compressor 90 driven by a motor 92 and supplying a storage tank 94 served by a discharge conduit 96 controlled by a manually operated shut-off valve 98. Also connected in the discharge line 96 is an automatic pressure control valve 100 of standard construction provided with a hand wheel 101 by means of which the valve may be set at any desired pressure indicated by a gauge 102. From the gauge 102 the pressure supply line leads to a valve 104 controlled by a handle 106 and controlling the supply of pressurized fluid to conduits 108 and 110 serving the hydraulic cylinder 60. A pressure accumulator 112 is connected into the conduit 110 serving the rear of the cylinder 60. The valve 104 is so arranged that there are three positions of the handle 106. In the center or neutral position, the supply of fluid to the conduits 108 and 110 is shut off. In another position of the handle 106 the valve 104 is arranged to vent the line 108 and to connect the line 110 to the supply line 96. In operating the machine, the valve 106 is first operated to move the piston 50 to a retracted position and the valve then closed until plastic material begins to come through the machine and leave the nozzle. Then the handle 106 is operated to connect the line 110 to the line 96 and the hand wheel 101 manipulated to adjust the pressure upon the piston to the desired value. At the end of the run, the handle 106 may be operated to release the pressure on the piston and to retract it as desired.

In Fig. 8 the machine of the invention is shown equipped with a pressure control system suitable for injection molding. In practice the systems shown in Figs. 7 and 8 may both be applied to the same machine, but for purposes of illustration they have been shown separately. The machine itself is shown in broken lines and should be considered to be the same as shown in Figs. 1–6 except that an injection mold 120 is shown applied to the forward end of the machine supported on a frame 122 for sliding movement in and out with respect to the nozzle 42. To move the mold 120 there is provided a plate 124 on which is mounted a hydraulic or pneumatic cylinder 126 containing a piston 128 secured to a shaft carrying at its end the mold 120.

The pressurized fluid for operating the system is provided from a conventional compressor and tank as shown in Fig. 7 and reaches the machine through a supply line 130. The latter is provided with a branch 131 leading to an automatic pressure regulating valve 132 which in turn supplies a valve 134 controlled by a pair of solenoids. From the valve 134 a supply line 136 leads to the rear of the cylinder 60 to provide forward movement for the piston 62, while a second line 138 leads to the forward part of the cylinder 60 for providing rearward movement for the piston 62. The supply line 130 also continues to a second automatic pressure regulating valve 140 and thence to a solenoid operated valve 142 arranged to supply two conduits 144 and 146 serving the cylinder 126.

The electrical system for operating the solenoid valves 134 and 142 receives current from supply lines 148 leading to a spring button switch 150 connected to one of the solenoids of the valve 142. When the switch 150 is closed, the valve 142 is operated to admit pressure to the conduit 144 in order to actuate the piston 128 and move the mold 120 into molding position in cooperation with the nozzle 42. The mold 120 carries a rod 152 mounted to control the operation of a limit switch 154, the arrangement being such that when the mold 120 reaches molding position, the switch 154 is operated to reset and start the operation of an automatic timer or stepping switch 156. The timer 156 is connected to solenoids at the valves 132 and 142. As soon as the timer 156 is placed in operation by the switch 154, the valve 134 is operated to admit fluid to the conduit 136, the result being that the piston 50 is moved forward through its stroke and the cavity of the mold 120 is filled. At the end of the cycle of operation of the timer 156, the valve 134 is operated in the opposite direction to supply the conduit 138 and supply pressure to retract the pistons 62 and 50. At the same time the valve 142 is operated to supply pressurized fluid to the conduit 146 and the cylinder 126 in order to move the piston 128 and mold 120 away from the nozzle 42. The mold 120 also carries a rod 158 arranged to operate a second limit switch 160. When the mold 120 is retracted, the limit switch 160 is closed, and the latter switch is connected to operate the valve 142 and start the cycle all over again. That is to say, the mold is again moved into molding position, the piston 50 is advanced and retracted, and the mold 120 then retracted. This cycle continues automatically as many times as desired. For semi-automatic operation there is connected into the line serving the limit switch 160 a toggle switch 162. If the toggle switch 162 is closed, the automatic operation continues, but if the toggle switch 162 is opened, then the machine is operated through only one complete cycle each time the button switch 150 is actuated.

It will now be evident that the machine of my invention is capable of operation with improved results either for injection molding or as an extruder. If the control systems for both types of operation are provided, and it is easy to do so, the owner of the machine is provided with a flexible installation which can be quickly converted from one type of operation to the other. Experience has shown that the power requirements for the machine of the invention are much less than encountered in the operation of conventional machines. For example, a machine constructed in accordance with the invention may be operated with a total of ten horsepower to produce at a rate which would require a capacity of forty horsepower with conventional equipment.

Having thus disclosed my invention, what I claim as new and desire to secure by Letters Patent of the United States is:

1. A machine of the character described comprising a material receiving barrel, a baffle thereon, a tube rotatable in said barrel having screening ports through its wall adjacent said baffle, feed means operable to force the material along the barrel against said baffle and through said screening ports and into said tube, a piston movable in said tube in coaction with said ports, and means beyond said ports to receive and continue the feed of the material screened therethrough.

2. A machine of the character described comprising a material receiving barrel, a baffle thereon, a tube rotatable in said barrel having spaced rows of screening ports through its wall adjacent said baffle, feed means about and rotatable with the tube to force the material along the barrel against said baffle and through said screening ports, and a piston in said tube variably movable to positions in closing relation to said ports, and a pump beyond said ports to receive and continue the feed of the material.

3. A machine of the character described comprising a receiving barrel, an annular baffle disposed against one end thereof, a tube rotatable in said barrel and journalled in the opening of said baffle, said tube having screening ports through its wall adjacent said baffle, feed means about and coacting with the tube to force the material along the barrel against said baffle and through said screening ports, a piston movable in said tube in coaction with said ports, and a pump beyond said ports to receive and continue the feed of the material.

4. A machine of the character described comprising a material receiving barrel, a baffle thereon, a tube rotatable in said barrel having screening ports through its wall adjacent said baffle, feed means about and coacting with the tube to force the material along the barrel against said baffle and through said screening ports, a piston movable in said tube in coaction with said ports, means beyond said ports to receive and continue the feed of the material, said tube having a portion extending beyond the barrel at the end opposite said means, and a power drive geared to said portion.

5. A machine of the character described comprising a material receiving barrel, a baffle thereon, a tube rotatable in said barrel having screening ports through its wall adjacent said baffle, feed means to force the material along the barrel against said baffle and through said screening ports, a pump beyond said ports to receive and continue the feed of the material, a hydraulic cylinder mounted adjacent one end of the barrel, and a ram operable by said cylinder disposed in said tube and coacting with said screening ports.

6. A machine of the character described comprising a material receiving barrel, a baffle thereon, a tube rotatable in said barrel having screening ports through its wall adjacent said baffle, feed means about and rotatable with the tube to force the material along the barrel against said baffle and through said screening ports, a pump beyond said ports to receive and continue the feed of the material, said tube having a portion extending beyond the barrel at the end opposite said pump, a power drive geared to said portion, a hydraulic cylinder adjacent one end of the barrel, and a ram operable by said cylinder disposed in said tube and co-acting with said screening ports.

7. A machine of the character described comprising a receiving barrel, an annular baffle disposed against one end thereof and extending inwardly beyond the chamber of the barrel, a tube rotatable in said barrel journalled in the baffle, said tube having a screw flight about the same and screening ports through its wall adjacent said baffle, said screw flight serving to advance material against said baffle and through said screening ports into the tube, gear-pump in unitary relation with the barrel to receive and advance material screened by the ports, means to operate the gear-pump, means to rotate said tube, a piston slidable in the tube in coaction with said screening ports, a rod extending from the piston, hydraulic cylinder means to slide said rod, and means adjacent one end of the barrel for carrying said cylinder.

8. A machine of the character described comprising a material receiving barrel, a baffle thereon, a tube rotatable in said barrel having screening ports through its wall adjacent said baffle, feed means operable to force the material along the barrel against said baffle and through said screening ports into the tube, and a piston movable in said tube in coaction with said ports.

9. A machine of the character described comprising a material receiving barrel, a baffle thereon, a tube rotatable in said barrel having a plurality of rows of screening ports through its wall adjacent said baffle, feed means about and rotatable with the tube to force the material along the barrel against said baffle and through said screening ports, and a piston in said tube variably movable to positions in closing relation to said ports.

10. A machine of the character described comprising a receiving barrel, an annular baffle disposed against one end thereof and extending inwardly beyond the chamber of the barrel, a tube rotatable in said barrel journalled in the baffle, said tube having a screw flight about the same and screening ports through its wall adjacent said baffle, said screw flight serving to advance material against said baffle and through said screening ports into the tube, means to rotate said tube, a piston slidable in the tube in coaction with said screening ports, a rod extending from the piston, hydraulic cylinder means to slide said rod, and means adjacent one end of the barrel for carrying said cylinder.

11. A machine of the character described, comprising a material receiving barrel, a baffle thereon, a tube rotatable in said barrel having screening ports through its wall adjacent said barrel, feed means operable to force material along the barrel against said baffle and through said screening ports, and a piston mounted within said tube for reciprocation therein to encounter material entering the tube through said screening ports, said piston being free to rotate with said tube.

12. A machine of the character described comprising a material receiving barrel, a baffle thereon, a tube rotatable in said barrel having screening ports through its wall adjacent said baffle, feed means about and rotatable with the tube to force the material along the barrel against said baffle and through said screening ports, and a piston in said tube variably movable to positions in closing relation to said ports, said piston also being mounted for rotation with said tube.

13. A machine of the character described comprising a receiving barrel, an annular baffle disposed against one end thereof and extending inwardly beyond the chamber of the barrel, a tube rotatable in said barrel journalled in the baffle, said tube having a screw flight about the same and screening ports through its wall adjacent said baffle, said screw flight serving to advance material against said baffle and through said screening ports into the tube, means to rotate said tube, a piston slidable in the tube in coaction with said screening ports, a rod extending from the piston, hydraulic cylinder means to slide said rod, a coupling connecting said rod to said hydraulic cylinder means and providing for rotation of the rod with respect to the cylinder means, and means adjacent one end of the barrel for carrying said cylinder.

14. A machine for treating plastic materials, comprising a barrel, a tube rotatably mounted in said barrel, feed means carried by said tube and operable to convey material axially along the interior of the barrel, a baffle mounted at the discharge end of the barrel to intercept material, said tube being provided adjacent the baffle with a plurality of rows of perforations, a piston mounted for reciprocation within said tube, and means for sliding said piston through a limited stroke from a position immediately behind the innermost of said perforations to a position just covering the foremost of the perforations.

15. A machine for treating plastic materials, comprising a barrel, a tube rotatably mounted in said barrel, feed means carried by said tube and operable to convey material axially along the interior of the barrel, a baffle mounted at the discharge end of the barrel to intercept material, said tube being provided adjacent the baffle with a plurality of rows of perforations, a piston mounted for reciprocation within said tube, and means for sliding said piston through a limited stroke from a retracted position clear of all the perforations to a position at which the piston just covers the foremost of the perforations.

16. A machine for treating plastic materials, comprising a barrel, a tube rotatably mounted in said barrel, feed means carried by said tube and operable to convey material axially along the interior of the barrel, a baffle mounted at the discharge end of the barrel to intercept material, said tube being provided adjacent the baffle with a plurality of rows of perforations, a piston mounted for reciprocation within said tube, and means for sliding said piston through a limited stroke from a position immediately behind the innermost of said perforations to a position just covering the foremost of the perforations, whereby the advancing piston progressively covers and closes the ports and whereby the retreating piston immediately uncovers the foremost ports.

17. A machine for treating plastic materials, comprising a barrel, a tube rotatably mounted in said barrel, a screw conveyor mounted on said tube and arranged to move material longitudinally along said barrel, a baffle mounted at the discharge end of the barrel, said tube being provided adjacent the baffle with a foraminous wall, and a piston provided with a convex forward face and mounted for reciprocation within said tube.

18. A machine of the character described comprising a material-receiving barrel, a baffle thereon, a tube rotatable in said barrel and having a plurality of rows of screening ports through its wall adjacent said baffle, feed means operable to force the material longitudinally between the barrel and the tube and through said screening ports into the tube, a nozzle disposed forwardly of said tube in position to receive material emerging therefrom, the diameter of each of said ports being relatively small as compared to the size of the nozzle opening, and a piston mounted for reciprocation in said tube in coaction with said ports.

19. A machine of the character described comprising a material-receiving barrel, a baffle thereon, a tube rotatable in said barrel and having screening ports through its wall adjacent said baffle, means for feeding material longitudinally between the barrel and the tube and through said screening ports into the tube, a piston mounted for sliding movement in said tube, and means for applying a constant predetermined pressure upon said piston, whereby said piston moves to and fro in relation to said ports as the pressure varies in that portion of the tube in advance of the piston.

20. A machine of the character described comprising a material-receiving barrel, a baffle thereon, a tube rotatable in said barrel having screening ports through its wall adjacent said baffle, feed means operable to force the material along the barrel against said baffle and through said screening ports into the tube, and a piston movable in said tube in coaction with said ports, the forward face of said piston having a convex configuration.

21. A machine for treating plastic materials, comprising a barrel, a tube rotatably mounted in said barrel, feed means carried by said tube and operable to convey material axially along the interior of the barrel, a baffle mounted at the discharge end of the barrel to intercept material, said tube being provided adjacent the baffle with a plurality of rows of perforations, a piston mounted for reciprocation within said tube, and means for sliding said piston through a limited stroke from a position immediately behind the innermost of said perforations to a position almost covering the foremost of the perforations.

22. A machine for treating plastic materials, comprising a barrel, a tube rotatably mounted in said barrel, feed means carried by said tube and operable to convey material axially along the interior of the barrel, a baffle mounted at the discharge end of the barrel to intercept material, said tube being provided adjacent the baffle with a plurality of rows of perforations, a piston mounted for reciprocation within said tube, and means for sliding said piston through a limited stroke from a retracted position clear of all the perforations to a position at which the piston almost covers the foremost of the perforations.

23. A machine for treating plastic materials, comprising a barrel, a tube rotatably mounted in said barrel, feed means carried by said tube and operable to convey material axially along the interior of the barrel, a baffle mounted at the discharge end of the barrel to intercept material, said tube being provided adjacent the baffle with a plurality of rows of perforations, a piston mounted for reciprocation within said tube, and means for sliding said piston through a limited stroke from a position immediately behind the innermost of said perforations to a position almost covering the foremost of the perforations, whereby the advancing piston progressively covers and closes the ports and whereby the retreating piston immediately uncovers the foremost ports.

References Cited in the file of this patent

UNITED STATES PATENTS

| Number | Name | Date |
| --- | --- | --- |
| 2,539,839 | Goessling | Oct. 10, 1944 |

FOREIGN PATENTS

| Number | Country | Date |
| --- | --- | --- |
| 511,764 | Great Britain | Aug. 23, 1939 |
| 676,602 | Great Britain | July 30, 1952 |